(12) United States Patent
Mori et al.

(10) Patent No.: US 6,818,353 B2
(45) Date of Patent: Nov. 16, 2004

(54) LITHIUM SECONDARY BATTERY AND MANUFACTURING METHOD THEREOF

(75) Inventors: Mitsuhiro Mori, Minato-ku (JP); Masato Shirakata, Minato-ku (JP); Jiro Iriyama, Minato-ku (JP); Tamaki Miura, Minato-ku (JP); Hironori Yamamoto, Minato-ku (JP); Koji Utsugi, Minato-ku (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/312,625

(22) PCT Filed: Jun. 22, 2001

(86) PCT No.: PCT/JP01/05350
§ 371 (c)(1),
(2), (4) Date: Dec. 27, 2002

(87) PCT Pub. No.: WO02/03485
PCT Pub. Date: Jan. 10, 2002

(65) Prior Publication Data
US 2003/0180608 A1 Sep. 25, 2003

(30) Foreign Application Priority Data
Jun. 30, 2000 (JP) ........................................ 2000-198221

(51) Int. Cl.$^7$ ................................................ H01M 2/16
(52) U.S. Cl. ................... 429/246; 429/231.95; 29/623.5
(58) Field of Search ............................ 429/137, 231.95, 429/246; 29/623.5

(56) References Cited

U.S. PATENT DOCUMENTS 3,568,597 A * 3/1971 Staehle ........................ 430/302
4,402,995 A * 9/1983 Fleischer ...................... 427/58

FOREIGN PATENT DOCUMENTS

| JP | 59-29381 | * | 2/1984 |
| JP | 6-36800 | A | 2/1994 |
| JP | 7-50162 | A | 2/1995 |
| JP | 7-296812 | A | 11/1995 |
| JP | 63-289759 | A | 11/1998 |

* cited by examiner

Primary Examiner—Laura Weiner
(74) Attorney, Agent, or Firm—Sughrue, Mion, PLLC

(57) ABSTRACT

A lithium secondary battery in the present invention includes as a negative electrode a lithium alloy, lithium metal formed on a conductive substrate by vacuum film-forming, or the lithium metal having a hydrophobic material layer formed on a surface of an amorphous metallic lithium. Such a lithium secondary battery gives satisfaction with no dendrite formation and long cycle life.

10 Claims, 2 Drawing Sheets

LITHIUM SECONDARY BATTERY AND MANUFACTURING METHOD THEREOF

TECHNICAL FIELD OF THE INVENTION

The present invention relates to a battery using lithium metal as a negative electrode, specifically to a secondary battery with a superior cycle life in which the growth of a dendrite can be suppressed.

BACKGROUND AND RELATED ART

A lithium battery using a lithium metal as a negative electrode has excellent energy density. However, a dendrite grows on the surface of the lithium metal serving as a negative electrode upon charging, and the dendrite may penetrate a separator and cause short circuit between the negative electrode and the positive electrode, resulting in failure of the function of the battery. Additionally, the short circuit may cause an abnormal reaction, and, as a result, causes a problem on the safety of the battery. The growth of the dendrite may deteriorate the cycle characteristics of the battery.

Hence, the method for preventing the dendrite growth has been proposed that a lithium alloy is formed by mixing the lithium metal with other components such as aluminum, bismuth, lead, tin, and indium, or a lithium oxide film is formed on the surface of the lithium metal. According to these methods, however, the operating voltage of the battery is lowered and the energy density is smaller as compared with a negative electrode made of the lithium metal.

Moreover, Japanese Patent Laid-Open No. 7-296812 discloses the proposal, instead of using the lithium metal foil formed by rolling; the amorphous lithium or the amorphous lithium alloy is used for the negative electrode.

The surface of the metallic lithium in an amorphous state of such negative electrode is made to be less likely to form a highly active reaction sites such as a crystal grain boundary, which is a singular point of the growth of dendrite. However, a battery with excellent characteristics cannot be obtained only by making an amorphous state in the negative electrode.

An object of the present invention is to provide lithium metal in a secondary battery, which is stable, is inhibited to grow dendrite shape. Such a secondary battery shows a superior energy density and a superior electromotive force upon long cycling.

DISCLOSURE OF INVENTION

Regarding a lithium secondary battery having a lithium metal or a lithium alloy as a material in a negative electrode, the drawback is overcome by the present invention. In the present invention, the battery has the negative electrode comprising of the lithium metal or the lithium alloy formed on the conductive substrate, the lithium metal or the lithium alloy formed by vacuum film-forming, or the amorphous metallic lithium or the amorphous lithium whose surface is coated with a hydrophobic material layer.

Further, according to the above-mentioned lithium secondary battery in the present invention, the hydrophobic material layer comprises at least a material selected from hydrocarbon and ester. The carbon atom in the hydrocarbon or the ester may be partially substituted with silicon atoms, or the hydrogen atoms in the hydrophobic material may be partially or entirely substituted with the fluorine atoms.

Additionally, according to the above-mentioned lithium secondary battery in the present invention, the hydrophobic material layer is formed on 90% or more of the surface of the negative electrode.

According to the above-mentioned lithium secondary battery in the present invention, the ester is made of at least a material selected from fatty ester, phenylcarboxylic acid ester, and diester. The carbon atoms in the ester may be partially substituted with silicon atoms, or the hydrogen atoms in the ester may be partially or entirely substituted with the fluorine atoms.

According to the above-mentioned lithium secondary battery in the present invention, the hydrophobic material is at least a material selected from a fluorine carboxylic acid ester, a phthalate ester, and a benzoic ester. Silicon atoms may partially substitute for the carbon atoms in these esters, or fluorine may substitute for hydrogen partially or entirely in these esters.

According to the above-mentioned lithium secondary battery in the present invention, the hydrophobic material is a material such as dioctyl phthalate, cetylnaphthalene, carboxylic acid ester, fluorine carboxylic acid ester, or neroli oil.

Further, according to the manufacturing method of the lithium secondary battery using lithium metal or a lithium alloy as a negative electrode in the present invention, the negative electrode is opposed to a positive electrode via a separator. The negative electrode is formed by the deposition of the lithium metal (or its alloy) or the amorphous metallic lithium (or its alloy) on the conductive substrate by vacuum film-forming. The negative electrode may be coated with the hydrophobic material by a method of dipping in a solution containing the hydrophobic material, by the sputtering method or by the vapor deposition method.

EMBODIMENT OF THE INVENTION

Figure 1:
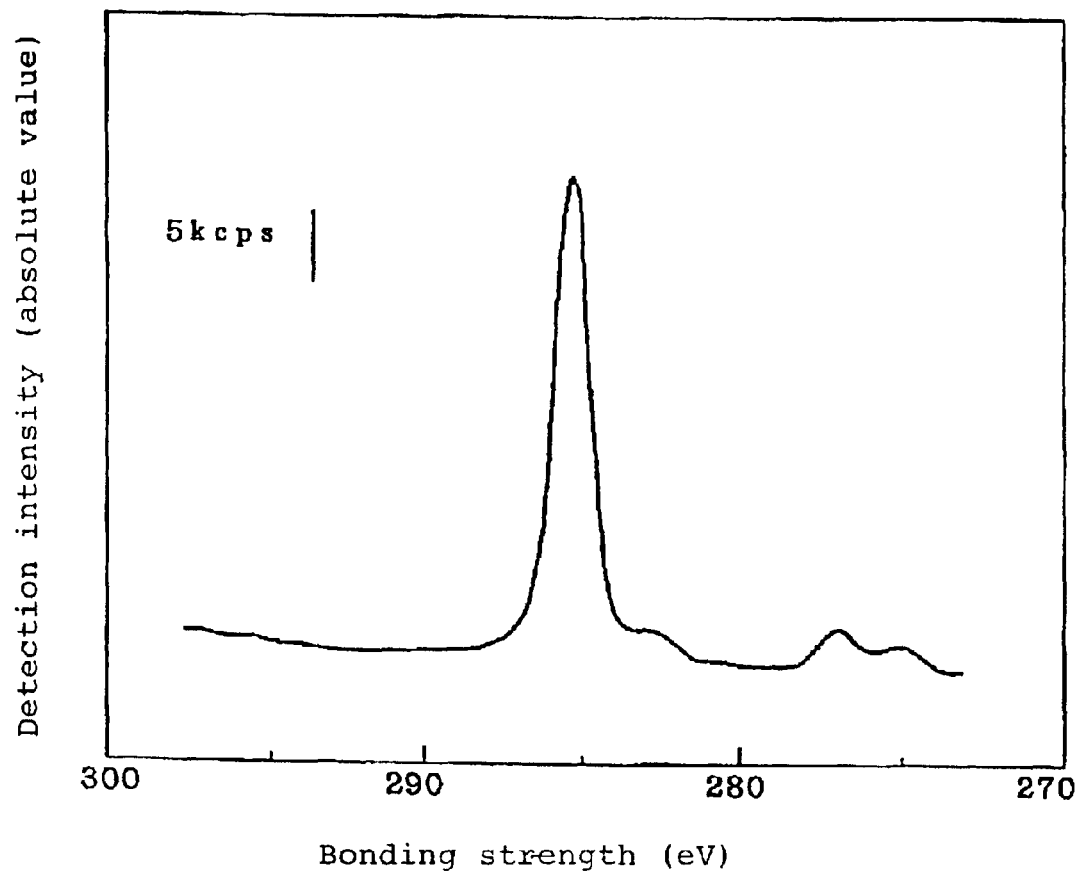
FIG. 1 shows a spectrum measured by an X-ray photoelectric spectrometry (XPS) on a surface of a negative electrode of the present invention.

It is found out in the present invention that regarding a metallic lithium or a lithium alloy that is used as a negative electrode of a lithium secondary battery, or metallic lithium or the lithium alloy that is composed of an amorphous metal formed by vacuum film-forming, since a hydrophobic material layer is formed thereon, a stable surface can be achieved even when charging/discharging is repeated after the battery is assembled, dendrite is not likely to occur, and favorable charge/discharge characteristics such as cycle characteristics can be obtained.

The metallic lithium or lithium alloy of the present invention is manufactured on a conductive body by a vacuum film-forming method such as vacuum evaporation and a sputtering method, or is prepared by forming amorphous lithium or an amorphous lithium alloy on the conductive body.

The amorphous lithium and the amorphous lithium alloy are formed by suitable methods including a melting solution cooling method, a liquid rapid cooling method, an atomize method, a vacuum evaporation method, a sputtering method, a plasma CVD method, an optical CVD method, and a thermal CVD method.

Moreover, as the amorphous lithium alloy, it is possible to adopt an alloy of two elements or three or more elements that includes Li and a metal such as Al, Pb, Sn, In, Bi, Ag, Ba, Ca, Hg, Pd, Pt, Sr, and Te, or the alloy further adding a material such as Si, Cd, Zn, and La or the like.

Additionally, in the case of the lithium alloy, an alloy is adopted in which the content of components other than lithium is 70% or below in atomic ratio.

Furthermore, as the conductive substrate, it is possible to adopt a sheet material such as metallic foil made of a material such as copper, nickel, stainless, aluminum, and silver. The thickness is 5 to 20 m.

Also, a lithium metal or a lithium alloy formed on the conductive substrate is preferably 10 to 500 m in thickness and is further preferably 15 to 300 m in thickness.

As a material used for forming the hydrophobic material layer on the surface of the lithium metal of the present invention, it is possible to adopt at least a compound selected from carbon hydrogen and ester that does not substantially react with lithium, silicon may partially substitute for the carbon, and a compound is applicable in which fluorine may substitute for hydrogen partially or entirely.

Further, it is preferable that ester is at least a material selected from fatty ester, phenylcarboxylic acid ester, and diester, silicon may partially substitute for the carbon, and fluorine may substitute for hydrogen partially or entirely. It is more preferable that ester is at least a material selected from fluorine carboxylic acid ester, phthalate ester, and benzoic ester, silicon may partially substitute for the carbon, and ester is composed of a compound in which fluorine may substitute for hydrogen partially or entirely.

To be specific, dioctyl phthalate, cetylnaphthalene, carboxylic acid, fluorine carboxylic acid ester, neroli oil and the like are applicable. It is particularly preferable to adopt a compound having affinity on the surface of metallic lithium. A compound containing a phenyl group like dioctyl phthalate is particularly desirable.

Since surface treatment is performed on lithium metal by using the hydrophobic materials, a hydrophobic material film is formed on the surface of lithium so as to improve the uniformity of the surface of lithium. Particularly a carboxylic acid group constituting ester has the function of bonding ester to the surface of lithium metal with stability and covering the surface of lithium metal with stability by using alkyl chains and phenyl chains that are contained in ester.

Consequently, it is possible to suppress the growth of dendrite on the surface of lithium metal and to suppress the reaction with impurities like moisture that is induced by a row material of an electrolytic solution, a positive electrode and a separator, and so on when assembling the battery.

Further, as the positive electrode used in the lithium secondary battery of the present invention, it is possible to adopt a complex oxide of $Li_xMO_2$ (here, M represents at least one transition metal) such as $Li_xCoO_2$, $Li_xNiO_2$, $Li_xMn_2O_4$, $Li_xMnO_3$, and $Li_xNi_yCo_{(1-y)}O_2$, and a conductive material such as carbon black and a binder such as polyvinylidene fluoride (PVDF) that are dispersed and kneaded with an agent such as N-methyl-2-pyrrolidone (NMP) and are applied onto a substrate such as aluminum foil.

Moreover, according to the lithium secondary battery of the present invention, the battery can be manufactured as follows: the negative electrode, which has a hydrophobic surface layer formed on the surface of lithium metal or a lithium alloy, and the above-mentioned positive electrodes are stacked via the separator, which is composed of a porous film made of fluorocarbon resin and polyolefin such as polypropylene and polyethylene in dried air or an inert gas atmosphere, or the stacked electrodes are wound and are mounted in a battery can, or the electrodes are sealed with a flexible film and so on, which is composed of a layered product of synthetic resin and metallic foil.

Additionally, as the electrolytic solution, it is possible to adopt an electrolytic solution in which lithium salt such as $LiPF_6$ is dissolved in an organic solvent such as propylene carbonate, ethylene carbonate, dimethyl carbonate, and diethyl carbonate.

Also, instead of the above electrolytic solutions, a solid electrolyte and a polymer electrolyte are applicable.

EXAMPLES

Referring to an example and a comparative example, the following will describe the present invention.

Example 1

Manufacturing of Lithium by Vapor Deposition

A vacuum vessel is decompressed in degree of vacuum to $10^{-5}$ Pa, copper foil with a length of 50 mm, a width of 50 mm, and a thickness of 10 m is used as a substrate, lithium is evaporated by electron beam, and lithium with a thickness of 20 m is precipitated while setting a temperature of copper foil at 90. Subsequently, the substrate on which lithium is evaporated is dipped into dioctyl phthalate in the vacuum vessel at 45 for three hours under a reduced pressure to form a surface layer made of dioctyl phthalate on a surface of lithium.

FIG. 1 shows an X-ray photoelectric spectrometry (XPS) spectrum on the surface of the obtained lithium. A peak (285.0 eV) indicating hydrocarbon exits and metallic lithium prepared by rolling and so on does not have a typical peak of lithium carbonate (290.2 eV).

Further, the surface layer, which is formed on the lithium surface and is reformed by dioctyl phthalate, is 7 nm in thickness according to the measurement conditions.

Moreover, a peak area shows that 90% or more of the surface layer is reformed by dioctyl phthalate.

Manufacturing of the Battery

Lithium previously formed on the copper foil is cut in size of 45 mm×40 mm, a nickel tab is welded to serve as a lithium negative electrode, $Li_xMn_2O_4$ is mixed with carbon black and polyvinylidene fluoride (PVDF), and a positive electrode is formed by applying positive electrode paint, which is dispersed and kneaded while N-metyl-2-pyrrolidone (NMP) serves as an agent, onto a surface of aluminum foil so as to have a thickness of 130 m after drying.

The negative electrode and the positive electrode are stacked via a separator made of polyethylene, and a laminate film is used as an outer casing material, in which a polypropylene film is stacked on a surface of the aluminum foil and a nylon film is stacked on the other surface thereof, to form the lithium secondary battery.

Figure 2:
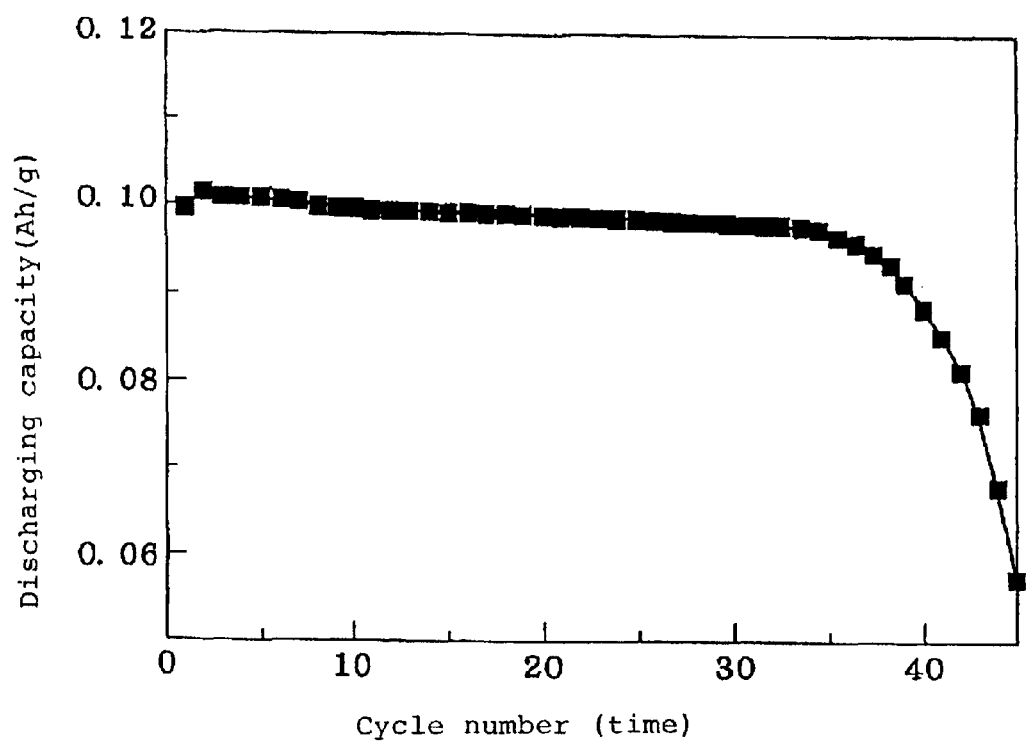
FIG. 2 shows charge/discharge characteristics of a lithium secondary battery according to an example of the present invention.

FIG. 2 shows a result of a charge/discharge test conducted on the obtained lithium secondary battery under the following charge/discharge test conditions.

Charge/Discharge Test

At temperatures of 20 and 45, a charging rate is set at 0.2 C and 0.5 C, a discharging rate is set at 0.2 C, a charge end voltage is set at 4.2 V, and a discharge end voltage is set at 3.0 V. A depth of discharge (DOD) is 30%. FIG. 1 shows the relationship between a discharging capacity and the number of cycles that are obtained at 20 and a charging rate of 0.2 C.

And then, in view of charge/discharge characteristics of FIG. 2, an average coulombic efficiency (%) E is calculated according to the following equation.

$E = 100 \times \{Q - Q_{ex}/(n-1)\}/Q$

Q denotes a capacity (Ah/g) upon charging and discharging, $Q_{ex}$ denotes a capacity of excessive metallic lithium (Ah/g), and n denotes the number of cycles until the excessive lithium is consumed completely.

Table 1 shows a test result obtained under each cycle test condition.

TABLE 1

|  | Temperature (° C.) | Charging rate | Coulombic efficiency (%) |
|---|---|---|---|
| Example 1 | 20 | 0.1 C | 98 |
|  | 20 | 0.2 C | 94 |
|  | 20 | 0.5 C | 81 |
|  | 45 | 0.1 C | 96 |
|  | 45 | 0.2 C | 85 |
|  | 45 | 0.5 C | 79 |
| Comparative Example 1 | 20 | 0.1 C | 85 |
|  | 20 | 0.2 C | 80 |
|  | 20 | 0.5 C | 76 |
|  | 45 | 0.1 C | 90 |
|  | 45 | 0.2 C | 77 |
|  | 45 | 0.5 C | — |

Comparative Example 1

After precipitating lithium metal by vacuum evaporation, a battery is formed in the same manner as Example 1 except that surface treatment is not performed using ester, and charge/discharge tests are conducted as in Example 1. The results are shown in Table 1.

Industrial Applicability

The present invention makes it possible to achieve a lithium secondary battery possessing superior energy density, superior electromotive force, long cycle life, and good safety, which are obtained by using metallic lithium as a negative electrode.

What is claimed is:

1. A lithium secondary battery having a negative electrode comprising a metal selected from a lithium metal and a lithium alloy, the metal being coated with a hydrophobic material layer
    wherein the hydrophobic material layer comprises at least a compound selected from a group consisting of a hydrocarbon compound and an ester, and wherein carbon atoms of the compound are partially substituted with silicon atoms or wherein hydrogen atoms of the compound are partially or entirely substituted with fluorine atoms.

2. The lithium secondary battery according to claim 1, wherein the ester compound is at least a compound selected from a group consisting of fatty ester, phenylcarboxylic acid ester and diester, and carbon atoms of the ester compound are partially substituted with silicon atoms or hydrogen atoms of the ester compound are partially or entirely substituted with fluorine atoms.

3. The lithium secondary battery according to claim 1, wherein the hydrophobic material is at least a compound selected from a group consisting of fluorine carboxylic acid ester, phthalate ester, and benzoic ester, and carbon atoms of the ester compound are partially substituted with silicon atoms or hydrogen atoms of the ester compound are partially or entirely substituted with fluorine atoms.

4. The lithium secondary battery according to claim 1, wherein the hydrophobic material is at least a compound selected from a group consisting of dioctyl phthalate, cetylnaphthalene, carboxylic acid ester, fluorine carboxylic acid ester, and neroli oil.

5. A lithium secondary battery having a negative electrode comprising a metal selected from amorphous lithium metal and an amorphous lithium alloy, the metal being coated with a hydrophobic material layer
    wherein the hydrophobic material layer comprises at least a compound selected from a group consisting of a hydrocarbon compound and an ester, and wherein carbon atoms of the compound are partially substituted with silicon atoms or wherein hydrogen atoms of the compound are partially or entirely substituted with fluorine atoms.

6. The lithium secondary battery according to claim 5, wherein the ester compound is at least a compound selected from a group consisting of fatty ester, phenylcarboxylic acid ester and diester, and wherein carbon atoms of the ester compound are partially substituted with silicon atoms or wherein hydrogen atoms of the ester compound are partially or entirely substituted with fluorine atoms.

7. The lithium secondary battery according to claim 5, wherein the hydrophobic material is at least a compound selected from a group consisting of fluorine carboxylic acid ester, phthalate ester, and benzoic ester, and wherein carbon atoms of the ester compound are partially substituted with silicon atoms or wherein hydrogen atoms of the ester compound are partially or entirely substituted with fluorine atoms.

8. The lithium secondary battery according to claim 5, wherein the hydrophobic material is at least a compound selected from a group consisting of dioctyl phthalate, cetylnaphthalene, carboxylic acid ester, fluorine carboxylic acid ester, and neroli oil.

9. A manufacturing method of a lithium secondary battery having a negative electrode comprising a lithium metal or a lithium alloy, characterized in that a surface of the lithium metal, the lithium alloy, or the lithium metal or the lithium alloy formed by vacuum film-forming, is processed by dipping into a hydrophobic material or by sputtering a hydrophobic material or by vapor deposition of a hydrophobic material, and then, the negative electrode is opposed to a positive electrode via a separator to form a battery
    wherein the hydrophobic material comprises at least a compound selected from a group consisting of a hydrocarbon compound and an ester, and wherein carbon atoms of the compound are partially substituted with silicon atoms or wherein hydrogen atoms of the compound are partially or entirely substituted with fluorine atoms.

10. A manufacturing method of a lithium secondary battery having a negative electrode comprising a lithium metal or a lithium alloy, characterized in that a surface of an amorphous lithium metal or an amorphous lithium alloy, is processed by dipping into a hydrophobic material or by sputtering a hydrophobic material or by vapor deposition of a hydrophobic material, and then, the negative electrode is desposed to a positive electrode via a separator to form a battery
    wherein the hydrophobic material comprises at least a compound selected from a group consisting of a hydrocarbon compound and an ester, and wherein carbon atoms of the compound are partially substituted with silicon atoms or wherein hydrogen atoms of the compound are partially or entirely substituted with fluorine atoms.

* * * * *